United States Patent
Diethorn et al.

(10) Patent No.: US 7,821,957 B2
(45) Date of Patent: Oct. 26, 2010

(54) ACKNOWLEDGMENT OF MEDIA WAVEFORMS BETWEEN TELECOMMUNICATIONS ENDPOINTS

(75) Inventors: Eric John Diethorn, Long Valley, NJ (US); Parameshwaran Krishnan, Basking Ridge, NJ (US); Jean Meloche, Madison, NJ (US); Balaji Sathyanarayana Rao, Somerville, NJ (US); Jay M. Stiles, Basking Ridge, NJ (US); John R. Tuck, Jr., Berkeley Heights, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 218 days.

(21) Appl. No.: 11/949,615

(22) Filed: Dec. 3, 2007

(65) Prior Publication Data

US 2009/0141647 A1 Jun. 4, 2009

(51) Int. Cl.
- H04L 1/00 (2006.01)
- H04L 12/28 (2006.01)
- H04B 1/44 (2006.01)
- H04M 3/22 (2006.01)
- H04M 9/08 (2006.01)

(52) U.S. Cl. ............... 370/252; 370/282; 370/419; 379/1.03; 379/406.01

(58) Field of Classification Search ............ 370/241, 370/252, 278, 282, 286, 290, 419; 379/1.01, 379/1.03, 406.01–406.03; 455/570
See application file for complete search history.

(56) References Cited

U.S. PATENT DOCUMENTS

| | | | |
|---|---|---|---|
| 6,449,255 B1 * | 9/2002 | Waclawsky | 370/252 |
| 7,173,910 B2 * | 2/2007 | Goodman | 370/252 |
| 7,328,150 B2 * | 2/2008 | Chen et al. | 704/219 |
| 7,408,884 B2 * | 8/2008 | Bauer et al. | 370/252 |
| 2004/0141528 A1 | 7/2004 | LeBlanc et al. | |
| 2004/0215448 A1 | 10/2004 | Funatsu et al. | |
| 2006/0153174 A1 | 7/2006 | Towns-von Stauber et al. | |
| 2007/0121611 A1 | 5/2007 | Rosenberg | |

* cited by examiner

*Primary Examiner*—Aung S Moe
*Assistant Examiner*—Kerri M Rose
(74) *Attorney, Agent, or Firm*—DeMont & Breyer, LLC

(57) ABSTRACT

An apparatus and method are disclosed that enable a first telecommunications endpoint to ensure that a second endpoint is receiving the first endpoint's packet stream transmissions with a satisfactory waveform quality. When the second endpoint receives the packet stream, it decodes the media waveform from the stream, encodes the waveform back into a second packet stream, and transmits some or all of the packets in the second stream back to the first endpoint. The first endpoint then decodes the received waveform in the second stream and compares it to the original waveform transmitted to the second endpoint. Based on the comparison, the first endpoint adjusts the value of a quality indication, and provides the quality indication to its user and to the second endpoint. Advantageously, the user at the second endpoint is able to determine whether the received waveform is, in fact, close enough to the waveform that the first endpoint's user intended to be received and understood.

19 Claims, 5 Drawing Sheets

ACKNOWLEDGMENT OF MEDIA WAVEFORMS BETWEEN TELECOMMUNICATIONS ENDPOINTS

FIELD OF THE INVENTION

The present invention relates to telecommunications in general, and, more particularly, to verifying whether a media waveform that is encoded by a first telecommunications endpoint has been satisfactorily received by a second telecommunications endpoint.

BACKGROUND OF THE INVENTION

When people communicate with each other over a distance, there is often uncertainty as to whether the participants hear each other. The uncertainty can be attributed to noise or other forms of impairment that are present in the transmission path between the participants. In radio communication, for example, impairments can come in the form of co-channel interference, Rayleigh fading, thermal noise, and so forth. Even in landline communications, in which a radio link is not present, impairments can still come in the form of echoes, transcoding errors, packet losses, and so forth.

The uncertainty in achieving successful communication is not specific to any one form of communication. This is evident, for example, in two-way radio communication for military, aerospace, or public service purposes, in which the participants are often forced to repeat what was heard. Additionally, in order to acknowledge and confirm the accuracy of the communication explicitly, the participants often have to use words such as "roger" to indicate that information has been received or "copy" to indicate that what was just said is understood. Even in cellular telecommunications, which comprises an adapted form of two-way radio communication, commercials and advertisements by the cellular service providers often feature themes of anxiety caused by a cell phone user not hearing someone else or of a service rep continually asking if someone else is able to hear him on his cell phone.

Not surprisingly, a lot of effort has been spent on improving the robustness of communications and ensuring each participant in a conversation that the other person is, in fact, hearing him. In a Voice over Internet Protocol context, for example, protocols such as Real-time Transport Control Protocol (RTCP) have been developed to deal with improving the robustness of communication, among other things. RTCP in particular provides out-of-band control information for a Real-time Transport Protocol (RTP) packet stream that conveys voice or other media information between endpoints. RTCP is intended to be used to transmit control packets periodically to participants in a streaming multimedia session, such as that transacted during a VoIP call. The primary function of RTCP is to provide feedback on the quality of service that is being provided for the transmitted RTP packet stream. The receiving endpoint of a packet stream can transmit RTCP packets back to the transmitting endpoint, in order to report the quality of service being experienced by the receiving endpoint.

SUMMARY OF THE INVENTION

The problem with relying on some of the protocols in the prior art, such as RTCP, is that they are primarily concerned with providing feedback on the quality of service, which concerns the properties of bandwidth, error rate, and latency, and which characterizes how well an endpoint is receiving data packets and bits. However, RTCP does not provide a mechanism for reporting on signal quality that is measured in the analog domain, which has to do with the relatively new concept of media waveform quality.

Media waveform quality is concerned with, but is not limited to, the properties of loudness, audio distortion, noise, fading, crosstalk, echo, and video distortion. In other words, waveform quality is concerned with different signal properties than is quality of service. For example, a receiving endpoint might be receiving packets at an acceptable quality of service, but might be receiving the underlying media waveform at an unacceptable waveform quality, on account of an impairment being introduced in the analog domain. One such analog-domain impairment is that which is introduced by a speech transcoder imperfectly converting speech signals from one format to another.

Moreover, even if the receiving endpoint, or more specifically its user, is receiving the media waveform with an acceptable perceived waveform quality, the recipient might not be able to determine that the received and decoded waveform still differs significantly from the waveform that was encoded and transmitted. This can be critical, for example, when transmitting high-quality audio for evaluation purposes or in systems that are used to memorialize conversations for legal purposes. That is, not only is it critical to receive acceptable waveform quality as perceived by the receiving party, it is often critical to receive what the transmitting party intended that the receiving party hear and understand.

The present invention enables a first telecommunications endpoint to ensure that a second endpoint is receiving the first endpoint's packet stream transmissions with a satisfactory waveform quality. In accordance with the illustrative embodiment of the present invention, when the second endpoint receives the packet stream, it decodes the media waveform from the stream, encodes the waveform back into a second packet stream, and transmits some or all of the packets in the second stream back to the first endpoint. The first endpoint then decodes the received waveform in the second stream and compares it to the original waveform transmitted to the second endpoint. Based on the comparison, the first endpoint adjusts the value of a quality indication, presents status that is based on the quality indication to its user, and transmits the quality indication to the second endpoint. In doing so, the user at the second endpoint is able to determine whether the received waveform is, in fact, close enough to the waveform that the first endpoint's user intended to be received and understood.

The invention is based on the idea that if the round-trip quality (i.e., that associated with going from first endpoint to second endpoint and back) is adequate, then the one-way-trip quality (i.e., that associated with going from first endpoint to second endpoint only) must be adequate as well. In accordance with the illustrative embodiment, the same idea is simultaneously applied in the opposite direction as well, in which the second endpoint compares a waveform that it receives from the first endpoint with the original waveform that the second endpoint transmitted to the first.

The endpoint of the illustrative embodiment of the present invention comprises: a transmitter interface that transmits, to a second telecommunications endpoint, a first packet stream that conveys a first media waveform a(t); a receiver interface that receives, from the second telecommunications endpoint, a second packet stream of data that represent a second media waveform a'(t); a processor that compares a'(t) with a(t) according to a predetermined characteristic and, based on the comparison, adjusts the value of a first quality indication; and a user interface that presents status that is based on the value of the first quality indication.

DETAILED DESCRIPTION

Figure 1:
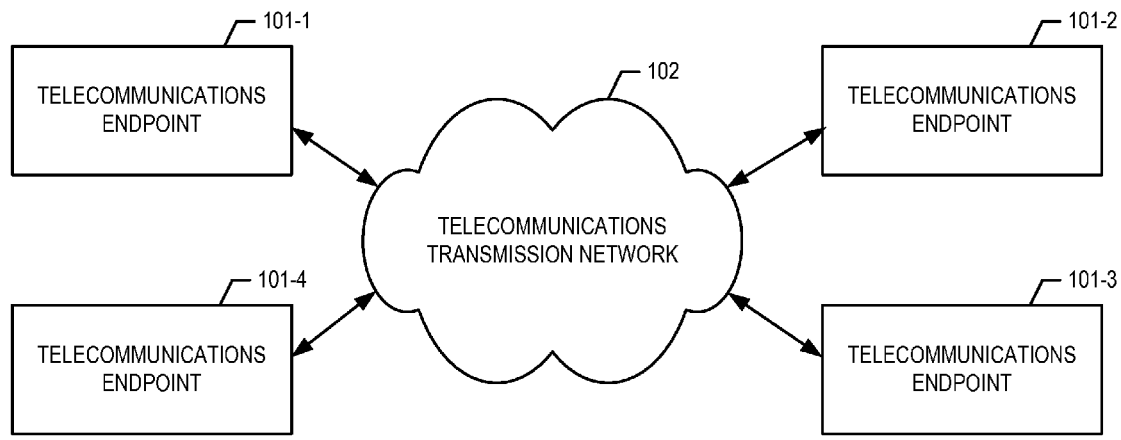
FIG. 1 depicts a block diagram of the salient components of telecommunications system 100, in accordance with the illustrative embodiment of the present invention.

FIG. 1 depicts a block diagram of the salient components of telecommunications system 100, in accordance with the illustrative embodiment of the present invention. System 100 comprises telecommunications endpoints 101-1 through 101-4 and telecommunications transmission network 102, interconnected as shown. Although the illustrative embodiment comprises four telecommunications endpoints, it will be clear to those skilled in the art, after reading this disclosure, how to make and use alternative embodiments of the present invention that comprise any number of telecommunications endpoints.

Telecommunications endpoint 101-*m*, where m has a value between 1 and M (M being equal to four in the illustrative embodiment) is a device that is capable of originating and/or receiving packet streams that are exchanged during calls. For example, endpoint 101-*m* can be a deskset telephone, a cellular telephone, a notebook computer, a personal digital assistant (PDA), a conference bridge, and so forth. Some or all of endpoints 101-1 through 101-M can be identical to or different from one another; for example, endpoint 101-1 can be a deskset, endpoint 101-2 can be a cell phone, endpoint 101-3 can be a softphone on a notebook computer, and endpoint 101-4 can be a conference bridge.

Endpoint 101-*m* handles calls via telecommunications transmission network 102 and is capable of exchanging voice and call processing-related signals with one or more other devices, such as the other endpoints within system 100. To this end, endpoint 101-*m* exchanges Internet Protocol (IP) data packets with other devices. In some alternative embodiments, however, endpoint 101-*m* might be an analog device that does not digitize information prior to transmission. In any event, it will be clear to those skilled in the art, after reading this specification, how to make and use telecommunications endpoint 101-*m*.

Telecommunications transmission network 102 is a network that transports the packet streams associated with calls between two or more telecommunications endpoints. A packet stream can comprise voice, video, and so forth. In accordance with the illustrative embodiment, network 102 comprises packet-switched infrastructure. However, it will be clear to those skilled in the art, after reading this disclosure, how to make and use alternative embodiments of the present invention in which network 102 comprises:

i. the Public Switched Telephone Network, or
ii. the Internet, or
iii. one or more other telecommunications networks, or
iv. any combination of i, ii, and iii.

Furthermore, as those who are skilled in the art will appreciate, network 102 can comprise speech transcoders or other types of transcoders, as are known in the art, in order to convert from one type of packet stream representation to another.

Figure 2:
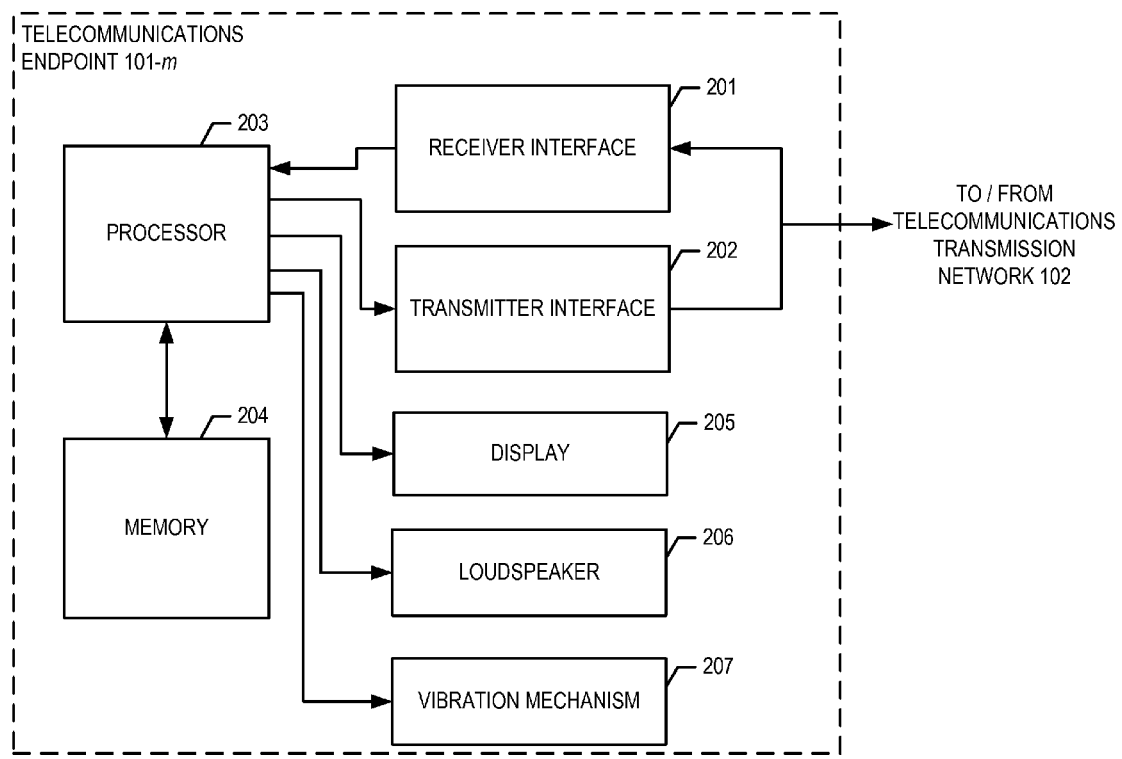
FIG. 2 is a block diagram of the salient components of telecommunications endpoint 101-*m* within system 100.

FIG. 2 is a block diagram of the salient components of telecommunications endpoint 101-*m* in accordance with the illustrative embodiment of the present invention, which components are interconnected as shown. In accordance with the illustrative embodiment, telecommunications endpoint 101-*m* comprises:

i. receiver interface 201,
ii. transmitter interface 202,
iii. processor 203,
iv. memory 204,
v. display 205,
vi. loudspeaker 206, and
vii. vibration mechanism 207.

It will be clear to those skilled in the art, after reading this disclosure, how to make and use alternative embodiments of the present invention in which telecommunications endpoint 101-*m* comprises any subcombination of the components listed above.

Receiver interface 201 and transmitter interface 202 comprise the circuitry that enables endpoint 101-*m* to respectively receive signals from and transmit signals to network 102, in well-known fashion. In accordance with the illustrative embodiment, endpoint 101-*m* receives and transmits media waveform signals that are encoded via the ITU G.729 standard and represented in Voice over Internet Protocol (VoIP) packet streams of data, in well-known fashion. As those who are skilled in the art will appreciate, in some alternative embodiments endpoint 101-*m* receives and transmits media waveform signals that are encoded and/or represented in a different format.

Processor 203 is a general-purpose processor that is capable of receiving information from receive interface 201, of executing instructions stored in memory 204, of reading data from and writing data into memory 204, and of transmitting information to transmit interface 202. Additionally, processor 203 is able to provide signals to display 205, loudspeaker 206, and vibration mechanism 207. In some alternative embodiments of the present invention, processor 203 might be a special-purpose processor.

Memory 204 stores the instructions and data used by processor 203, in well-known fashion. Memory 204 can be any combination of dynamic random-access memory (RAM), flash memory, disk drive memory, and so forth.

Display 205 is part of the user interface of endpoint 101-*m*. In accordance with the illustrative embodiment, display 205 comprises a liquid crystal display that is able to present the endpoint's user with a visual representation of status. It will be clear to those skilled in the art how to make and use alternative embodiments of the present invention in which display 205 comprises other than a liquid crystal display.

Loudspeaker 206 is another part of the user interface of endpoint 101-*m*. In accordance with the illustrative embodiment, loudspeaker 206 is able to present the endpoint's user with an audible representation of status. As those who are skilled in the art will appreciate, in some alternative embodiments of endpoint 101-*m*, loudspeaker 206 can instead be a type of electro-acoustic transducer other than a loudspeaker, such as an earpiece. In any event, it will be clear to those skilled on the art how to make and use loudspeaker 206.

Vibration mechanism 207 is yet another part of the user interface of endpoint 101-*m*. In accordance with the illustrative embodiment, mechanism 207 is able to present the endpoint's user with a tactile representation of status. It will be clear to those skilled on the art how to make and use vibration mechanism 207.

In accordance with the illustrative embodiment, endpoint 101-*m* performs the tasks described below and with respect to FIGS. 3 and 4. As those who are skilled in the art will appreciate, each component within endpoint 101-*m* can perform a different subset of the described tasks. For example, those tasks that processor 203 can perform include the decoding of a media waveform from a received packet stream, the encoding of a media waveform into a packet stream to be transmitted, and the comparing of one or more predetermined characteristics of a first media waveform with those of a second media waveform.

Figure 3:
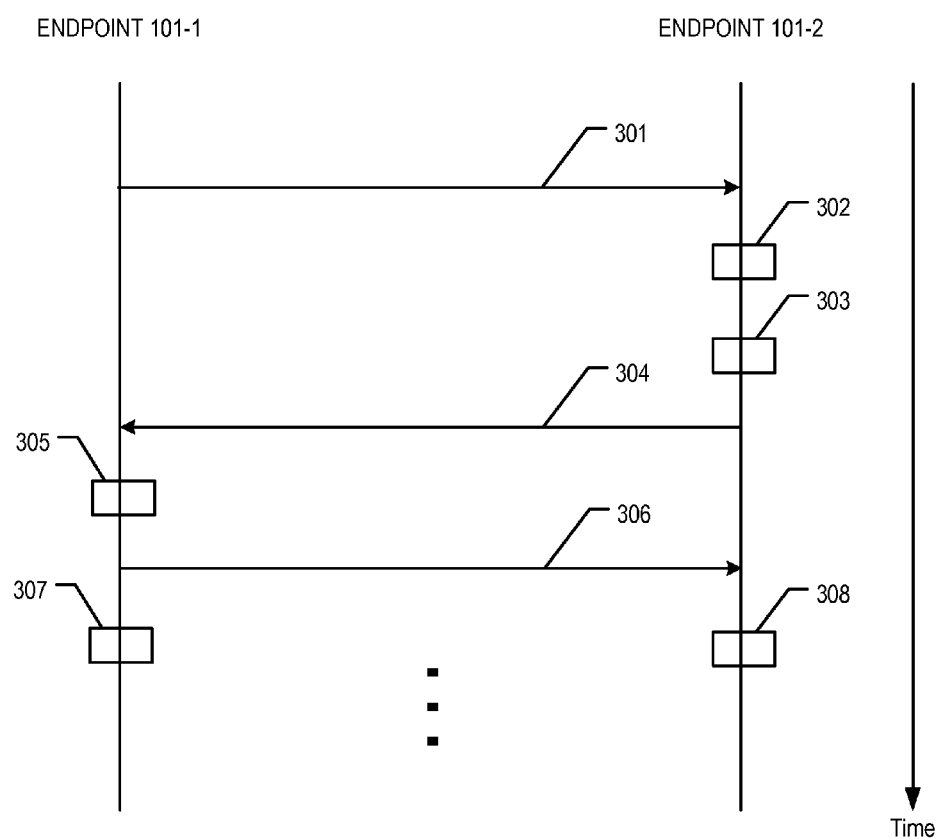
FIG. 3 depicts a diagram of the salient messages and tasks that are related to exchanging packet streams, as well as to analyzing the waveform content of those packet streams, in accordance with the illustrative embodiment of the present invention.
Figure 4:
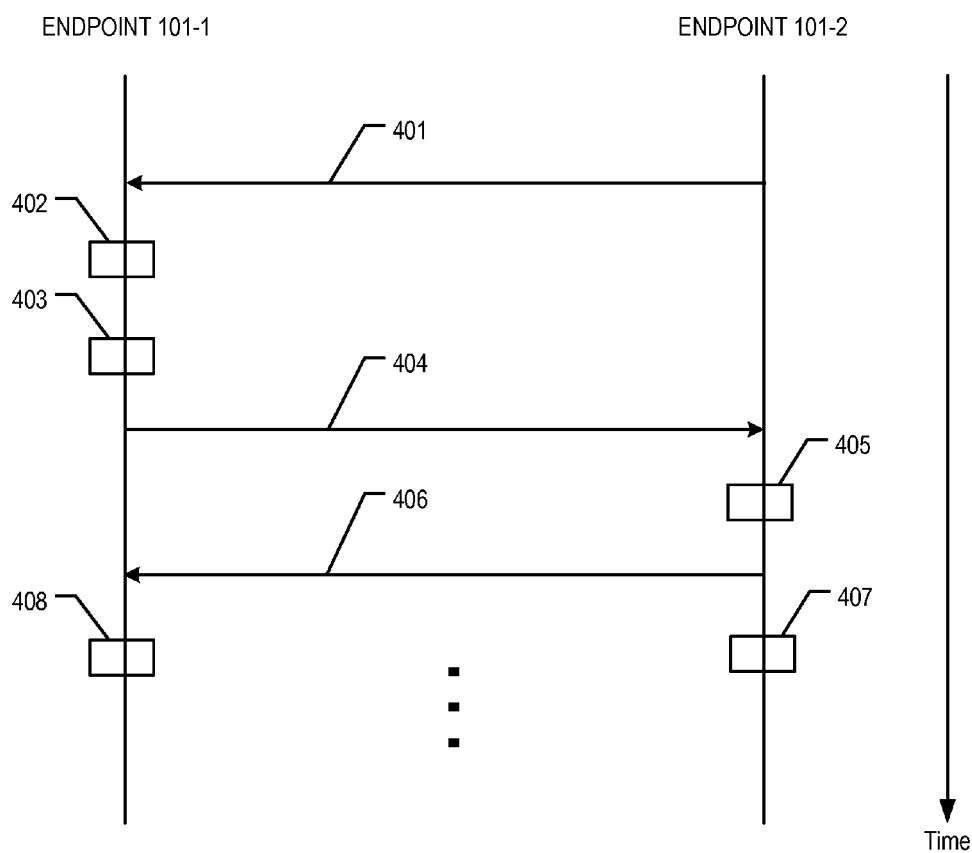
FIG. 4 depicts a diagram of salient messages and tasks depicted in FIG. 3, in which endpoints 101-1 and 101-2 have exchanged roles.

FIG. 3 depicts a diagram of the salient messages and tasks that are related to exchanging packet streams, as well as to analyzing the waveform content of those packet streams, in accordance with the illustrative embodiment of the present invention. As those who are skilled in the art will appreciate, some of the messages and tasks that appear in the diagrams that follow can be performed in parallel or in a different order than that depicted. Moreover, those who are skilled in the art will further appreciate that in some alternative embodiments of the present invention, only a subset of the depicted messages and tasks are performed.

As depicted in FIG. 3, telecommunications endpoints 101-1 and 101-2 are exchanging packet streams of data, each of which represents a media waveform, as part of a two-way call with each other. In accordance with the scenario, endpoints 101-1 and 101-2 exchange voice waveforms of their user's voices. However, as those who are skilled in the art will appreciate, in other scenarios, two or more endpoints can exchange other types of media, in accordance with the techniques described herein.

Endpoint 101-1 transmits packet stream 301 to endpoint 101-2, which packet stream of data conveys a first media waveform a(t), which is of the voice of endpoint 101-1's user.

Endpoint 101-2 receives packet stream 301 and, at task 302, decodes a second media waveform a'(t) from the received packet stream. The distinction between the first media waveform and the second media waveform is important, in that the second media waveform is supposed to be a reproduction of the first media waveform, but is not necessarily guaranteed to be an exact reproduction. The lack of a guarantee is due to the first media waveform being subjected to one or more impairments (e.g., encoding errors, transcoding errors, decoding errors, etc.) between endpoint 101-1 and endpoint 101-2.

Endpoint 101-2, at task 303, then encodes the decoded second media waveform into a second packet stream of data, namely packet stream 304, and transmits the packet stream to endpoint 101-1. This is performed so that endpoint 101-1 will have a waveform to compare with the first media waveform that it previously transmitted to endpoint 101-2.

In some alternative embodiments, endpoint 101-2 prepares and transmits a representative model of the waveform, instead of encoding and transmitting the waveform itself. In some other alternative embodiments, endpoint 101-2 selects some or all of the payload data received in packet stream 301 and inserts the payload data into packet stream 304, instead of decoding and encoding that data.

Endpoint 101-1 receives packet stream 304 and decodes a third media waveform from the received packet stream. The distinction between the first media waveform and the third media waveform, or between the second media waveform and the third media waveform, is important in that the third media waveform is supposed to be a reproduction of the first media waveform—or of the second media waveform, for that matter—but is not necessarily guaranteed to be an exact reproduction.

At task 305, after decoding the signal, endpoint 101-1 compares a the first media waveform, which was represented by a portion of packet stream 301, with the third media waveform, which was represented by a portion of packet stream 304, based on a predetermined characteristic or characteristics. The characteristics used in the comparison can comprise one or more of the following:
  i. loudness,
  ii. audio distortion,
  iii. noise,
  iv. fading,
  v. crosstalk,
  vi. echo, and
  vii. video distortion (e.g., spatial, temporal, optical, etc.).

As those who are skilled in the art will appreciate, more than one characteristic can be compared and other characteristics not listed above can be compared. Furthermore, the actual method of comparison can involve a correlation, a bit-by-bit matching, an evaluation of the transmitted waveform with respect to a received speech or music model that represents the waveform, and so forth. In any event, it will be clear to those skilled in the art how to compare one waveform to another waveform or to a representation (e.g., a model, etc.) of that other waveform, based on one or more characteristics.

Based on the outcome of the comparison performed at task 305, endpoint 101-1 adjusts the value of a quality indication and subsequently transmits it to endpoint 101-2 as part of message 306. For example, an indication of acceptable quality can be transmitted whenever the two waveforms compare acceptably enough. This might be dictated by the possibility that any waveform degradation might have occurred during the transmission of stream 304, not during the transmission of stream 301, in which case only a positive indication of acceptable quality will provide a definitive statement of the waveform quality experienced by endpoint 101-2.

Alternatively, an indication of unacceptable quality can be transmitted whenever the two waveforms fail to compare unacceptably. This might be appropriate when, for example, when the media waveform represented by stream 304 is guaranteed not to have suffered degradation, such as when stream 304 is transmitted over a conditioned path with lossless encoding. In any event, it will be clear to those skilled in the art how to determine a threshold of acceptability, based on the characteristic or characteristics used in the comparison.

At task 307, endpoint 101-1 presents to its user the status of the waveform transmission, via the user interface (i.e., display 205, loudspeaker 206, and/or vibration mechanism 207 of endpoint 101-1). The status is based on the quality indication whose value was adjusted at task 305.

The method of presentation to endpoint 101-1's user (e.g., visual, audible, tactile, etc.), in some embodiments, depends on the value of the quality indication as adjusted at task 305. Furthermore, in some other embodiments, the method of presentation to the user depends on the audio mode in which the user operates endpoint 101-1 (e.g., with a handset, with a headset, with a speaker, etc.). For example, if the user operates endpoint 101-1 using an audio mode in which the endpoint is held close to the ear, it might be more effective to provide a tactile sensation to the user for the purpose of providing the quality status. As those who are skilled in the art will appreciate, the presentation method can be based on a combination of the quality indication value, the audio mode, and other characteristics of endpoint 101-1, the user, the call, and/or the information exchanged between endpoints.

If the presentation method is visual, display 205 can render the value of the quality indication in one or more of a variety of formats, such as by using different numbers, different colors, different numbers of bars, smiley face/frowning face icons, and so forth.

At task 308 endpoint 101-2 presents to its user the status of the waveform transmission, via the user interface (i.e., display 205 and/or loudspeaker 206 of endpoint 101-2). The status is based on the quality indication whose value was provided in message 306.

The method of presentation to endpoint 101-2's user (e.g., visual, audible, tactile, etc.), in some embodiments, depends on the value of the quality indication as provided in message 306. Furthermore, in some other embodiments the method of presentation to the user depends on the audio mode in which the user operates endpoint 101-2. As those who are skilled in the art will appreciate, the presentation method can be based on a combination of the quality indication value, the audio mode, and other characteristics of endpoint 101-2, the user, the call, and/or the information exchanged between endpoints.

In some embodiments, endpoint 101-1 adjusts the number of bits transmitted per unit time in packet stream 301 going forward, based on the value of the quality indication determined at task 305. For example, if the quality comparison appears to be favorable, the number of bits transmitted to endpoint 101-2 might be decreased with little or no effect in waveform quality—for example, by changing the speech encoding (i.e., vocoding) process. As those who are skilled in the art will appreciate, the decision to increase or decrease the number of bits transmitted, as well as by how much, can depend on other factors as well.

In some embodiments, endpoint 101-2 adjusts the number of bits transmitted per unit time in packet stream 304 going forward, based on the value of the quality indication received in message 306. For example, if the quality comparison appears to be favorable, the number of bits transmitted back to endpoint 101-1 might be decreased with little or no effect in the comparison. As those who are skilled in the art will appreciate, the decision to increase or decrease the number of bits transmitted, as well as by how much, can depend on other factors as well.

Throughout the duration of the call, endpoints 101-1 and 101-2 continually perform the tasks and exchange the messages described with respect to FIG. 3. Furthermore, in some embodiments, endpoints 101-1 and 101-2 perform each other's roles for a different set of waveforms. For example, endpoint 101-2 transmits a media waveform b(t) of its user's voice to endpoint 101-1, which decodes a media waveform b'(t) from the received packet stream. In other words, as depicted in FIG. 4, endpoint 101-1 performs the tasks that were performed by endpoint 101-2 in FIG. 3, and endpoint 101-2 performs the tasks that were performed by endpoint 101-1 in FIG. 3. This reflected by stream 401 being transmitted by endpoint 101-2, task 402 being performed by endpoint 101-1, and so forth, where tasks 401 through 408 correspond to tasks 301 through 308, respectively.

As those who are skilled in the art will appreciate, after reading this specification, the telecommunications endpoint of the illustrative embodiment can exchange packet streams, as well as analyze the waveform content of those packet streams, as part of a three-way call. In a three-way call (e.g., involving endpoints 101-1, 101-2, and 101-3, etc.), at least one endpoint, such as endpoint 101-1, exchanges packet streams with two other endpoints, such as endpoints 101-2 and 101-3. In that case, endpoint 101-1 would perform the techniques of the illustrative embodiment both on the packet streams associated with endpoint 101-2, as described earlier, and on the packet streams associated with endpoint 101-3.

Figure 5:
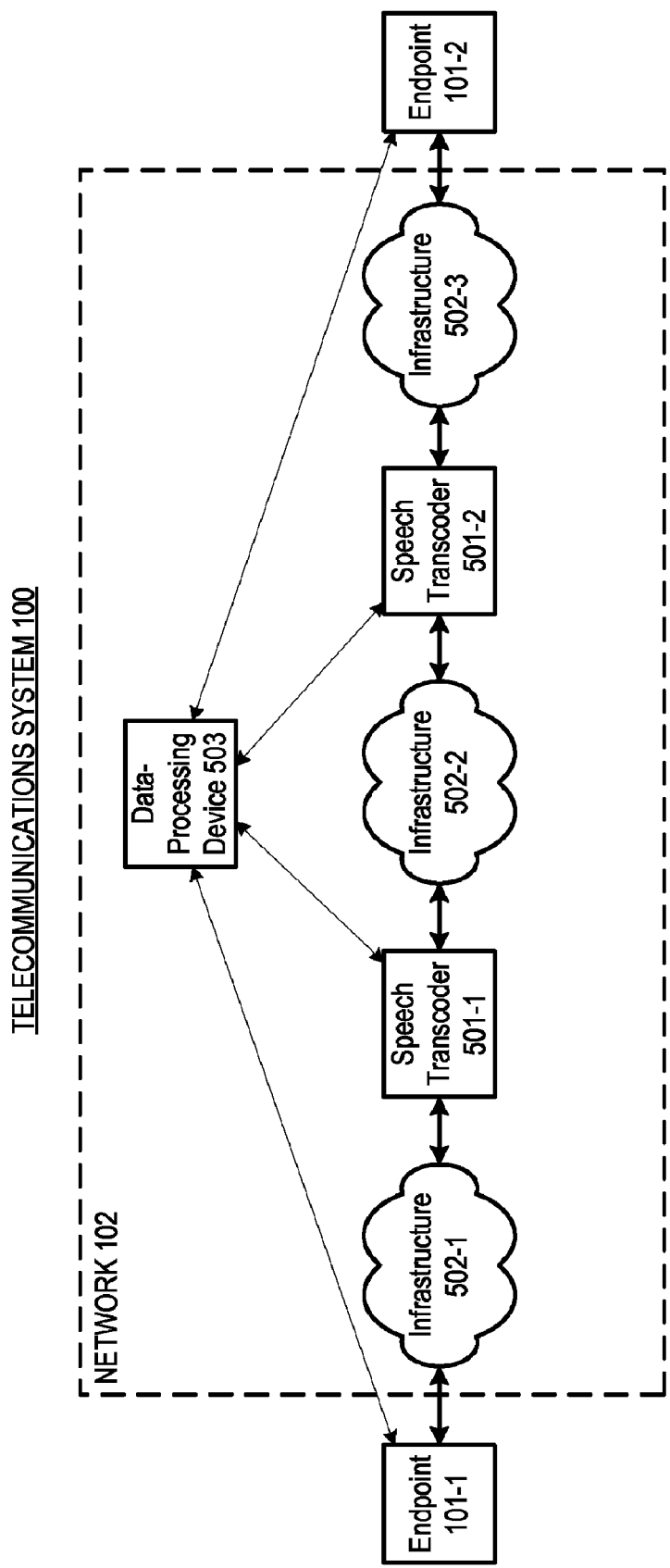
FIG. 5 depicts another block diagram of telecommunications system 100, showing the presence of speech transcoders within network 102.

FIG. 5 depicts another block diagram of telecommunications system 100, showing the presence of speech transcoders within network 102. As depicted in FIGS. 3 and 4, endpoints 101-1 and 101-2 are communicating with each other. The packet streams that are being exchanged traverse network 102 elements, including speech transcoders 501-1 and 501-2 and infrastructures 502-1, 502-2, and 502-3. As those who are skilled in the art will appreciate, the speech transcoders can be situated at gateway nodes, as are known in the art. Additionally, one or more of the telecommunications devices depicted (e.g., endpoints, speech encoders, etc.) are able to transmit quality indications to data-processing device 503, which can be a server or other device that can be used to concentrate data and/or control one or more telecommunications devices.

In accordance with the illustrative embodiment, one or more of the depicted pairs of telecommunications devices (e.g., endpoint 101-1 and transcoder 501-1, transcoders 501-1 and 501-2, transcoder 501-2 and endpoint 101-2, etc.) are able to perform the tasks described above and with respect to FIGS. 3 and 4. For example, transcoders 501-1 and 501-2 are able to exchange packet streams with each other, compare the content of those streams, and adjust quality indications accordingly for their particular transmission-path segment.

Additionally, one or more of the depicted telecommunications devices are able to transmit their quality indications to data-processing device 503. In some embodiments, device 503 is able to transmit messages to one or more of the devices, in order to modify the packet streams that are exchanged between the devices. For example, if device 503 determines that a lower encoding rate might be sufficient along one or more transmission-path segments between endpoints 101-1 and 101-2, the server might specify that the affected devices use a vocoder with a lower bit rate. As another example, if device 503 determines that too much bandwidth is being used to transmit a packet stream back to a device for comparison purposes, the server might specify that a representation with a lower bit rate be used to represent a waveform, such as a representative speech model.

As those who are skilled in the art will appreciate, after reading this specification, endpoint 101-m or device 503 might be a centralized data-processing system, such as a conference bridge, which handles the exchange of packet streams with at least two other endpoints, as well as the analysis of the waveform content of those packet streams and/or the subsequent notification and control of one or more other devices.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A first telecommunications endpoint comprising:
    a transmitter interface for transmitting, to a second telecommunications endpoint, a first packet stream that conveys a first media waveform a(t);
    a receiver interface for receiving, from the second telecommunications endpoint, a second packet stream of data that represent a second media waveform a'(t); and
    a processor for comparing a'(t) with a(t) according to a predetermined characteristic and for adjusting, based on the comparison, the value of a first quality indication, wherein the value of the first quality indication indicates at least one of:
   I) an acceptable quality based on the comparison of a'(t) with a(t) according to the predetermined characteristic, and
   II) an unacceptable quality based on the comparison of a'(t) with a(t) according to the predetermined characteristic;
wherein a(t) is of a user's voice and a'(t) is a reproduction of the user's voice; and
wherein the number of bits transmitted per unit time in the first packet stream of data is affected by the adjusted value of the first quality indication.

2. The first telecommunications endpoint of claim 1 wherein the transmitter interface also transmits the first quality indication to the second telecommunications endpoint.

3. The first telecommunications endpoint of claim 1 wherein the receiver interface also receives, from the second telecommunications endpoint, a third packet stream that conveys a third media waveform b(t) which has been encoded by the second telecommunications endpoint, and
   wherein the processor decodes a fourth media waveform b'(t) from the third packet stream of data and encodes b'(t) into a fourth packet stream of data, and
   wherein the transmitter Interface also transmits, to the second telecommunications endpoint, the fourth packet stream of data.

4. The first telecommunications endpoint of claim 3 wherein the receiver interface also receives a second quality indication from the second telecommunications endpoint, wherein the value of the second quality indication is based on a comparison between b'(t) and b(t).

5. The first telecommunications endpoint of claim 4 further comprising a user interface for presenting status that is based on the value of the second quality indication.

6. The first telecommunications endpoint of claim 1 further comprising a user Interface for presenting status that is based on the value of the first quality indication.

7. The first telecommunications endpoint of claim 1 wherein the first packet stream passes through a speech transcoder that is physically discrete from both the first and second telecommunications endpoints.

8. A first telecommunications endpoint comprising:
   a processor for decoding a second media waveform a'(t) from a first packet stream that conveys a first media waveform a(t) and for encoding a'(t) into a second packet stream;
   a transmitter interface for transmitting the second packet stream to a second telecommunications endpoint;
   a receiver interface for receiving, from the second telecommunications endpoint, the first packet stream and a first quality indication that includes a value, wherein the second telecommunications endpoint:
      i) compares a(t) with a'(t) as decoded from the second packet stream, and
      ii) adjusts the value of the first quality indication based on the comparison;
   wherein the value of the first quality indication indicates at least one of:
      I) an acceptable quality based on the comparison of a'(t) with a(t), and
      II) an unacceptable quality based on the comparison of a'(t) with a(t), and
   a user interface for presenting status that is based on the value of the first quality indication.

9. The first telecommunications endpoint of claim 8 wherein the number of bits transmitted per unit time In the second packet stream is based on the value of the first quality indication.

10. The first telecommunications endpoint of claim 8 wherein the transmitter interface also transmits, to the second telecommunications endpoint,
   i) a third packet stream of data that conveys a third media waveform b(t), and
   ii) a second quality indication; and
   wherein the receiver interface also receives, from the second telecommunications endpoint, a fourth packet stream of data that represent a fourth media waveform b'(t); and
   wherein the processor also compares b'(t) with b(t) according to a predetermined characteristic and, based on the comparison, adjusts the value of the second quality indication prior to its transmission.

11. The first telecommunications endpoint of claim 10 wherein the user interface also presents status that is based on the value of the second quality indication.

12. The first telecommunications endpoint of claim 10 wherein the first media waveform a(t) is of a first user's voice, the second media waveform a'(t) is a reproduction of the first user's voice, the third media waveform b(t) is of a second user's voice, and the fourth media waveform b'(t) is a reproduction of the second user's voice.

13. The first telecommunications endpoint of claim 12 wherein the first packet stream passes through a speech transcoder that is physically discrete from both the first and second telecommunications endpoints.

14. A method comprising:
   transmitting, from a first telecommunications endpoint to a second telecommunications endpoint, a first packet stream that conveys a first media waveform a(t);
   receiving, from the second telecommunications endpoint, a second packet stream of data that represent a second media waveform a'(t);
   comparing, by the first telecommunications endpoint, a''(t) with a(t) according to a predetermined characteristic; and
   adjusting, by the first telecommunications endpoint based on the comparison, the value of a first quality indication;
   wherein the value of the first quality indication indicates at least one of:
      I) an acceptable quality based on the comparison of a'(t)) with a(t) according to the predetermined characteristic, and
      II) an unacceptable quality based on the comparison of a'(t) with a(t) according to the predetermined characteristic;
   wherein a(t) is of a user's voice and a'(t) is a reproduction of the user's voice; and
   wherein the number of bits transmitted per unit time in the first packet stream of data is affected by the adjusted value of the first quality indication.

15. The method of claim 14 further comprising transmitting the first quality indication to the second telecommunications endpoint.

16. The method of claim 14 further comprising receiving, from the second telecommunications endpoint, a third packet stream that conveys a third media waveform b(t) which has been encoded by the second telecommunications endpoint;
   decoding a fourth media waveform b'(t) from the third packet stream of data and encodes b'(t) into a fourth packet stream of data; and transmitting, to the second telecommunications endpoint, the fourth packet stream of data.

17. The method of claim 16 further comprising receiving a second quality indication from the second telecommunications endpoint, wherein the value of the second quality indication is based on a comparison between b't) and b(t).

18. The method of claim 17 further comprising presenting status that is based on the value of the second quality indication.

19. The method of claim 14 further comprising presenting status that is based on the value of the first quality indication.

* * * * *